United States Patent
Sandgren et al.

(10) Patent No.: US 12,286,023 B2
(45) Date of Patent: Apr. 29, 2025

(54) SYSTEM AND METHOD FOR POSITIONING A VEHICLE AT A CHARGING STATION

(71) Applicant: VOLVO TRUCK CORPORATION, Gothenburg (SE)

(72) Inventors: Victor Sandgren, Gothenburg (SE); Jingxu Gu, Kungälv (SE); Mikaela Öhman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 298 days.

(21) Appl. No.: 17/643,555

(22) Filed: Dec. 9, 2021

(65) Prior Publication Data

US 2022/0194244 A1    Jun. 23, 2022

(30) Foreign Application Priority Data

Dec. 18, 2020    (EP) .................................... 20215460

(51) Int. Cl.
| | | |
|---|---|---|
| *B60L 53/36* | (2019.01) | |
| *B60L 53/126* | (2019.01) | |
| *B60L 53/30* | (2019.01) | |
| *B60L 53/66* | (2019.01) | |
| *B60L 53/38* | (2019.01) | |

(52) U.S. Cl.
CPC ............ *B60L 53/36* (2019.02); *B60L 53/126* (2019.02); *B60L 53/305* (2019.02); *B60L 53/66* (2019.02); *B60L 53/38* (2019.02)

(58) Field of Classification Search
CPC ........ B60L 53/36; B60L 53/126; B60L 53/66; B60L 53/305; B60L 53/38; G01S 11/04;
(Continued)

(56) References Cited

U.S. PATENT DOCUMENTS

| 6,992,622 B1 | 1/2006 | Chiang et al. |
|---|---|---|
| 10,320,245 B2 | 6/2019 | Sieber |

(Continued)

FOREIGN PATENT DOCUMENTS

| CN | 107942318 A | 4/2018 |
|---|---|---|
| CN | 111186320 A | 5/2020 |

(Continued)

OTHER PUBLICATIONS

Kulakowski et al., Angle-of-arrival localization based on antenna arrays for wireless sensor networks, 2010, Computers and Electrical Engineering 36 (2010) 1181-1186 (Year: 2010).*

(Continued)

*Primary Examiner* — Yufeng Zhang
(74) *Attorney, Agent, or Firm* — Venable LLP; Jeffri A. Kaminski (57) ABSTRACT

A system for positioning a vehicle at a charging station. The system comprises: a wireless communication arrangement comprising a first communication device configured to wirelessly communicate with a second communication device by a wireless protocol; a vehicle positioning arrangement comprising a transmitting antenna configured to transmit a detection signal, and a receiving antenna configured to receive the detection signal. The transmission of the detection signal by the transmitting antenna and/or the detection of the detection signal by the receiving antenna is controlled to determine an angle between the transmitting antenna and the receiving antenna, which angle is used to guide the vehicle to a predetermined position at the charging station. The first communication device comprises one of the transmitting antenna and receiving antenna of the vehicle positioning arrangement.

16 Claims, 5 Drawing Sheets

(58) Field of Classification Search
CPC ....... G01S 3/16; G01B 15/00; G01R 29/0878; H02J 50/12; H02J 50/80; H02J 50/90
See application file for complete search history.

(56) References Cited

U.S. PATENT DOCUMENTS

| | | | |
|---|---|---|---|
| 2011/0026624 A1* | 2/2011 | Gummalla | H01Q 15/0086 342/374 |
| 2012/0095617 A1 | 4/2012 | Martin | |
| 2018/0375390 A1 | 12/2018 | Sieber | |

FOREIGN PATENT DOCUMENTS

| | | |
|---|---|---|
| DE | 102010063665 A1 | 6/2012 |
| DE | 102013110280 A1 | 3/2015 |
| WO | 2016209503 A1 | 12/2016 |

OTHER PUBLICATIONS

Bossler et al., Manual of Geospatial Science and Technology, 2013 (Year: 2013).*

Malajner Marko et al: 11 Angle of Arrival 1-17 Measurement Using Multiple Static Monopole Antennas 11, IEEE Sensors Journal, IEEE Service Center, New York, NY, US, vol. 15, No. 6, Jun. 1, 2015 (Jun. 1, 2015), pp. 3328-3337, XP011579806, ISSN: 1530-437X, DOI:10. 1109/JSEN.2014.2386537.

European Search Report dated May 18, 2021 in corresponding European Patent Application No. 20215460.5, 13 pages.

Chinese Office Action dated Feb. 28, 2025 in corresponding Chinese Patent Application No. 2021115423196.3, 17 pages.

* cited by examiner

SYSTEM AND METHOD FOR POSITIONING A VEHICLE AT A CHARGING STATION

TECHNICAL FIELD

The present invention relates to a system and method for positioning a vehicle at a charging station. The invention further relates to a computer program comprising program code means for performing the method.

BACKGROUND

A vehicle typically comprises an engine for propelling the vehicle. The engine may be powered by various means, such as e.g. by a liquid or gaseous fuel in an internal combustion engine, or by electric power in an electric machine or electric motor. Moreover, hybrid solutions exist in which the vehicle is propelled both by an internal combustion engine and an electric machine. In either way, a battery may be used to power the electric machine, which battery periodically needs to be charged.

One common solution to charge the battery is by a plug connected to a power source, such as e.g. a power grid, by an electrical wire. Typically, the vehicle is parked in a parking/charging spot providing such charging capabilities, and the driver or other person manually plug the power transmitter into a power receiver, e.g. a socket of the vehicle, the socket being in electrical communication with the battery enabling charging of the same. Another solution to charge the battery is by a wireless charging system. The wireless charging system typically includes a charging station having a power emitting coil, or transmission coil, configured to emit electromagnetic radiation. The wireless charging system typically further comprises a power receiving coil, preferably arranged on the vehicle and in electrical communication with the battery, and configured to receive the emitted electromagnetic radiation for charging the battery.

When a vehicle approaches a charging spot the vehicle is to be positioned in order to enable charging by the charging capabilities. For example, marks in the road or a physical stop at the end of the charging spot may be provided to guide the vehicle into a position enabling charging, or at least close enough to enable fine tuning positioning of the charging means. However, such positioning assistance of the vehicle has limitations, as e.g. the marks or physical stop is the same regardless of the characteristics of the vehicle.

Thus, there is a need in the industry for an improved positioning of the vehicle at a charging spot.

SUMMARY

It is an object of the present disclosure to at least to some extent alleviate the shortcomings discussed above in relation to known vehicle positioning assistance, and to improve a system for positioning a vehicle at a charging station.

According to at least a first aspect of the present invention, a system for positioning a vehicle at a charging station is provided. The system comprises:
 a wireless communication arrangement comprising a first communication device configured to wirelessly communicate with a second communication device by a wireless protocol,
 a vehicle positioning arrangement comprising a transmitting antenna configured to transmit a detection signal, and a receiving antenna configured to receive the detection signal, one of the transmitting antenna and receiving antenna being arranged on the vehicle and the other one on the charging station,
 wherein the transmission of the detection signal by the transmitting antenna and/or the detection of the detection signal by the receiving antenna is controlled to determine an angle between the transmitting antenna and the receiving antenna, which angle is used to guide the vehicle to a predetermined position at the charging station, and wherein the first communication device comprises the transmitting antenna or receiving antenna of the vehicle positioning arrangement.

Hereby, an effective yet simple system for enabling an efficient positioning of the vehicle at the charging station is provided. Thus, the charging procedure of the vehicle may be improved. In particular, by utilizing the communication arrangement, which normally is installed at a charging station and/or in a vehicle, existing devices, such as the first communication device, may be utilized for at least a part of the vehicle positioning arrangement. Thus, the number of components, or at least additional components, for positioning the vehicle at the charging station can be reduced or minimised. Moreover, by determining the angle between the transmitting antenna and the receiving antenna utilizing at least the first communication device, the position of the vehicle relative the charging station can be determined in a straightforward manner. Moreover, the positing of the vehicle at the charging station can be achieved in a desired manner for different type of vehicles or different vehicle characteristics, such as e.g. vehicles of different sizes.

It should be understood that when stating that the transmission of the detection signal by the transmitting antenna and/or the detection of the detection signal by the receiving antenna is controlled to determine the angle between the transmitting antenna and the receiving antenna, typically the vehicle positioning arrangement is configured to achieve such control of the detection signal by the transmitting antenna and/or the detection of the detection signal by the receiving antenna.

According to at least one example embodiment, the vehicle comprises an electric machine and a battery configured to power the electric machine. The vehicle may be referred to as an electric vehicle, and may for example be full electric vehicle or a hybrid. Thus, the electric machine is preferably a traction electric machine configured to at least partly contributing in propelling the vehicle. In other words, the electric machine is coupled to a drive shaft, e.g. via a gear box, the drive shaft being configured to transfer motion to propelling means of the vehicle, such as the wheels. The vehicle is configured to be charged by the charging station, e.g. via a power cable, a power conducting means including a power transmitter on the charging station and a power receiver on the vehicle, or a wireless charging arrangement such as e.g. inductive charging. For example, and according to at least one example embodiment, the charging station may comprise a movable arm comprising the power transmitter and being configured to move in order to contact a part of the vehicle such as e.g. the roof of the vehicle. Correspondingly, the power receiver of the vehicle may be arranged on the roof of the vehicle and be arranged as e.g. contact rail. Such charging configuration with a movable arm and roof-mounted contact rails may referred to as conductive static charging via a pantograph. By the charging, the battery configured to power the electric machine may be charged, e.g. using direct current.

The wireless communication arrangement may be based on any wireless communication technology, e.g. Wi-Fi, Zigbee, Bluetooth or radio. For example, the wireless communication arrangement is a Wi-Fi arrangement using a communication protocol of IEEE 802.11 utilizing various frequencies, including but not limited to, 2.4 GHz, 5 GHz, 6 GHz, and 60 GHz frequency bands. If another wireless communication technology is used, the adequate communication protocol is used. The communication protocol defines the rules, syntax, semantics and synchronization of communication and possible error recovery methods. The communication protocols may be implemented by hardware, software, or a combination of both. Thus, the wireless communicating arrangement of the invention use well-defined formats for exchanging communication between the first and second communication device.

According to at least one example embodiment, the antenna of the first communication device used for the wireless communication with the second communication device is used as the transmitting or receiving antenna, depending on which of the transmitting and receiving antenna that is comprised in the first communication device. Hereby, the number of components of the system may be even further reduced.

That is, the transmitting or receiving antenna, depending on which of the transmitting and receiving antenna that is comprised in the first communication device, may be used for wireless communication with the second communication device using said wireless protocol in addition to be used in the vehicle positioning arrangement for determining the said angle between the transmitting antenna and the receiving antenna. Alternatively, the transmitting or receiving antenna, depending on which of the transmitting and receiving antenna that is comprised in the first communication device, is present in the first communication device in addition to a secondary transmitting or receiving antenna used for wirelessly communication with the second communication device by said wireless protocol. Thus, the transmitting or receiving antenna, depending on which of the transmitting and receiving antenna that is comprised in the first communication device, may be used in the vehicle positioning arrangement for determining the said angle between the transmitting antenna and the receiving antenna without being configured to wirelessly communicate with the second communication device by said wireless protocol.

According to at least one example embodiment, the transmitting antenna and the receiving antenna are configured to wirelessly communicate with each other by means of a wireless protocol. For example, the wireless protocol is the same as that for the wireless communication between the first communication device and the second communication device. The wireless protocol may thus be based on any wireless communication technology, e.g. Wi-Fi, Zigbee, Bluetooth or radio. Preferably, Wi-Fi is used. However, it should be understood that the antenna function described below related to an array of antenna elements configured to form a radiation pattern having a main lobe, wherein the array of antenna elements is arranged to form a directional antenna being able to change the shape of the main lobe, is independent of, or at least applicable independently of, the wireless protocol used for the transmitting antenna and receiving antenna.

The angle between the transmitting antenna and the receiving antenna determined by the vehicle positioning arrangement may be referred to as the determined angle.

According to at least one example embodiment, the angle is determined by means of polar coordinates. Herby, the angle as well as the direction of a geometrical vector extending from the transmitting antenna to the receiving antenna can advantageously be determined. Thus, and according to at least one example embodiment, the determined angle comprises the direction between the transmitting antenna and the receiving antenna. According to at least one example embodiment, the transmission of the detection signal by the transmitting antenna and/or the detection of the detection signal by the receiving antenna is controlled to determine the angle and the direction between the transmitting antenna and the receiving antenna.

According to at least one example embodiment, the determined angle is determined in relation to a three dimensional space. That is, the angle between the transmitting antenna and the receiving antenna in the three dimensional space is determined. Thus, as the transmitting antenna and the receiving antenna is separated in the three dimensional space, there exist a geometrical vector extending from the transmitting antenna to the receiving antenna. Such geometrical vector may e.g. be defined in relation to a spherical coordinate system according to ISO 80000-2:2019. Thus, the vehicle positioning arrangement may be configured to determine the angle in relation to such spherical coordinate system. Hereby, the angle as well as the direction of the geometrical vector extending from the transmitting antenna to the receiving antenna may be determined by the vehicle positioning arrangement.

The geometrical vector extending from the transmitting antenna to the receiving antenna may be referred to as the radial distance from the transmitting antenna to the receiving antenna (with reference to the spherical coordinate system). In other words, and with reference to the x-axis, y-axis and z-axis of the coordinate system in the three dimensional space, the determined angle may be determined from the polar angle measured from the z-axis, and the azimuthal angle of its orthogonal projection on a reference plane (xy-plane) that passes through the origin (i.e. the transmitting or receiving antenna) and is orthogonal to the z-direction, measured from a fixed reference direction on that plane. The radial distance may be referred to as the radius or radial coordinate. The polar angle may be called colatitude, zenith angle, normal angle, or inclination angle. Thus, by the determined angle, and knowing either the radial distance from the transmitting antenna to the receiving antenna, or the distance in the z-direction, the distance in the xy-plane between the transmitting antenna and the receiving antenna may be determined. Moreover, by the determined angle (i.e. both the polar angle and the azimuthal angle), the direction of such distance in the xy-plane is known, facilitating the guiding of the vehicle to the predetermined position. The determined angle is therefore sometimes referred to as simply "the angle" or "the angle and direction" in the present application.

According to at least one example embodiment, the transmitting antenna is arranged on the charging station and the receiving antenna is arranged on the vehicle. According to at least one example embodiment, the first communication device is arranged on the charging station. Thus, the first communication device comprising the transmitting antenna may be arranged on the charging station. According to at least one example embodiment, the receiving antenna is not comprised in the second communication device. According to at least one alternative example embodiment, the transmitting antenna is arranged on the vehicle and the receiving antenna is arranged on the charging station. According to at least one example embodiment, the first communication device is arranged on the vehicle. Thus, the first communication device comprising the receiving antenna may be arranged on the vehicle. According to at least one example embodiment, the transmitting antenna is not comprised in the second communication device. Alternatively, the first communication device is arranged on the vehicle, and comprises the transmitting antenna or the transmitting antenna.

According to at least one example embodiment, the charging station comprises a charging post, e.g. configured for overhead charging of the vehicle using e.g. a pantograph. Thus, the charging post may be several meters high, such as e.g. above 3 m, or above 4.5 m. For example, the first communication device comprising the transmitting or receiving antenna is arranged on top of the charging station. For such example, the transmitting or receiving antenna of the vehicle is preferably arranged on the roof of the vehicle.

According to at least one example embodiment, the transmission of the detection signal by the transmitting antenna and/or the detection of the detection signal by the receiving antenna is controlled by changing the transmission or detection, e.g. the direction of the transmission or detection, wherein the angle and direction between the transmitting antenna and the receiving antenna may be determined by determining the signal strength of the detection signal in relation to the direction (or change in direction) of the transmission or detection. That is, the angle as well as the direction of the geometrical vector extending from the transmitting antenna to the receiving antenna may be determined by the vehicle positioning arrangement as previously described, by determining the signal strength of the detection signal in relation to the direction (or change in direction) of the transmission or detection.

According to at least one example embodiment, the transmitting antenna is configured to scan its surroundings to detect or recognize a receiving antenna compatible with the transmitting antenna. Such detection or recognition may e.g. be achieved by a beacon signal. That is, the transmitting antenna may be configured to transmit a beacon signal. Once the receiving antenna detects the beacon, or is recognized otherwise, the determination of the angle and the direction between the transmitting antenna and the receiving antenna may be initiated.

According to at least one example embodiment, the predetermined position is a desired position at which the vehicle can be charged at the charging station. For example, the vehicle positioning arrangement is configured to position the vehicle within at least 20 cm, or within at least 10 cm, of the predetermined position at the charging station. Thus, the vehicle positioning arrangement is configured to locate the vehicle in a charging position relative to the charging station, or at least close enough to a charging position for enabling fine tuning positioning of the charging means (such as fine tuning positioning of a power transmitter of the charging station relative to a power receiver of the vehicle to initiate charging of the vehicle). For example, the vehicle positioning arrangement is configured to guide the vehicle from: a non-chargeable position in which the vehicle is distant from the charging position e.g. by that the power transmitter of the charging station is distant from the power receiver of the vehicle (i.e. the transmitter of the charging station is undetectable for the power receiver of the vehicle); to the charging position.

According to at least one example embodiment, the positioning of the vehicle at the charging station may be divided into at least two separate positioning scales, a macroscale for positioning the vehicle from a first position to a second position, and a microscale for fine tune positioning the vehicle, or a charging means, from a third position to a fourth position. Typically, the distance between the first and second position is larger than 1 m, or larger than 2 m, or larger than 5 m. For example, the distance between the first and second position may be delimited by a maximum distance corresponding to the detection capability between the transmitting antenna and the receiving antenna. The vehicle is typically driven (manually or autonomously) the distance between the first and second position. In other words, the re-positioning of the vehicle between the first and second position is achieved by moving the vehicle in a driving direction.

According to at least one example embodiment, the vehicle positioning arrangement is configured to position the vehicle at the charging station in accordance with both the macroscale positioning and the fine tuning positioning. According to at least one example embodiment, the vehicle positioning arrangement is configured to position the vehicle at the charging station in accordance with the macroscale positioning. According to at least one example embodiment, the vehicle positioning arrangement is configured to position the vehicle at the charging station in accordance with the macroscale positioning and not the fine tuning positioning. Such excluded fine tuning positioning may e.g. include repositioning a power receiving coil relative a power emitting coil of a wireless charging arrangement.

According to at least one example embodiment, the vehicle positioning arrangement is configured to position the vehicle at the charging station by re-positioning the vehicle by at least 1 m, or at least 2 m, or at least 5 m.

According to at least one example embodiment, at least one of the transmitting antenna and receiving antenna comprises an array of antenna elements configured to form a radiation pattern having a main lobe, wherein the array of antenna elements is arranged to form a directional antenna being able to change the shape of the main lobe.

Thus, by utilizing a directional antenna and the shape of the main lobe, the angle and direction between the transmitting antenna and the receiving antenna may be determined e.g. by measuring the signal strength of the detection signal, and comparing the signal strength with the change in direction of the directional antenna, or change of the shape of the main lobe. Thus, the array of antenna elements is configured to shape the radiation pattern to receive or direct the detection signal by controlling (activating and deactivating) the antenna elements. Thus, the antenna elements in the array of antenna elements are actively controllable. I other words, the vehicle positioning arrangement is configured to form a first shape of the radiation pattern, or first shape of the main lobe, by activating a first sub-set of the antenna elements, and to form a second shape of the radiation pattern, or second shape of the main lobe, by activating a second sub-set of the antenna elements, the second sub-set being at least partly different from the first sub-set. Thus, by comparing the signal strength of the detection signal between the first and second shapes of the radiation pattern or main lobe, the angle and direction between the transmitting antenna and the receiving antenna may be determined as previously described. Typically, more than two shapes of the radiation pattern or main lobe and corresponding signal strength of the detection signal are compared to determine said angle and direction.

According to at least one example embodiment, the number of antenna elements in the array of antenna elements is at least 5, or at least 7, or at least 9.

According to at least one example embodiment, both the transmitting antenna and the receiving antenna comprises an array of antenna elements, wherein the antenna element are arranged in the same antenna pattern or in a different antenna pattern.

According to at least one example embodiment, the array of antenna elements is arranged in an xy-plane, wherein the vehicle positioning arrangement is configured to shape the main lobe by activating the antenna elements in a focused direction, e.g. the x-direction and/or y-direction.

Thus, the array of antenna elements may be defined in a three dimensional space defined by a Cartesian coordinate system by an x-axis, a y-axis and a z-axis. Thus, the shape of the main lobe may be controlled at least in the xy-plane. The xy-plane may e.g. be a horizontal plane. According to at least one example embodiment, the focused direction of the antenna elements is a linear direction in the xy-plane. Typically, when activating the antenna elements in a focused direction, a sub-set of the antenna elements in said direction is activated, while the other antenna elements of the array of antenna elements are deactivated. When changing the focused direction, another sub-set of the antenna elements is activated, and other antenna elements of the array of antenna elements are deactivated. The array of antenna elements typically forms an antenna pattern of the antenna elements, e.g. an antenna pattern of a cross.

According to at least one example embodiment, the vehicle positioning arrangement is configured to introduce a phase difference between neighbouring antenna elements.

Such phase difference is e.g. achieved by controlling the feed current to each antenna element. For example, the feed current for each antenna element passes through a phase shifter controlled by a control unit. Thus, the array of antenna elements may be referred to as a phased array of antenna elements.

According to at least one example embodiment, the vehicle positioning arrangement is configured to achieve a tilt of the main lobe by introducing the phase difference between neighbouring antenna elements being activated in a focused direction.

Thus, by altering the phase difference between the antenna elements, the radiation pattern or shape of the main lobe may be controlled, and thus the direction of maximum intensity of the transmitting antenna, or sensitivity of the receiving antenna, is controlled. By repeating such altering of the phase difference between the various antenna elements in different focused direction, i.e. moving the main lobe around or vary the direction of the main lobe, and measuring the signal strength during such procedure, the direction of the transmitting antenna relative the receiving antenna i.e. the angle and direction between the transmitting antenna and the receiving antenna, can be determined.

Stated differently, and according to at least one example embodiment, the vehicle positioning arrangement is configured to detect the signal strength of the detection signal in relation to different tilting (or different shapes of the main lobe), and based on the signal strength determine the angle (and direction) between the transmitting antenna and the receiving antenna.

Thus, and according to at least one example embodiment, the vehicle positioning arrangement is configured to repeatedly alter the phase difference between the various antenna elements to vary the direction of the main lobe.

Hereby, the direction of the main lobe is changed, or varied, over time.

According to at least one example embodiment, the phase difference of the array of antenna elements is achieved for the antenna of the vehicle (the transmitting antenna or receiving antenna). That is, the vehicle positioning arrangement is configured to introduce a phase difference between neighbouring antenna elements of the antenna of the vehicle.

According to at least one example embodiment, the vehicle comprises the receiving antenna, wherein the phase difference of the array of antenna elements is achieved for the receiving antenna of the vehicle. By manipulating the pattern of the vehicle antenna (by altering the phase difference between the antenna elements), the vehicle can determine the direction of the maximum intensity of the sensitivity of the receiving antenna, and thus the direction of the charging station, without any synchronization between vehicle and the charging station. Typically, the transmitting antenna is then configured to transmit a fixed detection signal (either formed as a directional antenna or not). That is, the direction of the detection signal of the transmitting antenna is fixed as it is not varied over time.

According to at least one example embodiment, the vertical distance between the transmitting antenna and receiving antenna is known or predetermined.

The vertical distance is here defined as distance in the z-direction, or along the z-axis, of a three dimensional coordinate system. Thus, the vertical distance between the transmitting antenna and receiving antenna may be referred to the height difference between the transmitting antenna and receiving antenna. By knowing the vertical distance (or height distance) between the transmitting antenna and receiving antenna, and the angle and direction between the transmitting antenna and the receiving antenna, the distance (e.g. the horizontal distance) between the transmitting antenna and the receiving antenna may be determined. Thus, the distance (e.g. the horizontal distance) between the charging station and the vehicle may be determined. Thus, positioning of the vehicle at the predetermined position at the charging station may be achieved in a straightforward manner. The vertical distance (or height distance) between the transmitting antenna and receiving antenna may be e.g. be determined by that the respective vertical position (or height position) of the transmitting antenna and receiving antenna is communicated between the charging station and the vehicle by the wireless communication arrangement. Moreover, the vehicle may know on beforehand the height of the charging station and the height position of the transmitting antenna or receiving antenna, whichever being installed at the charging station. The height of the transmitting antenna and receiving antenna on the charging station and vehicle is typically defined in relation to the ground, or the road.

According to a second aspect of the invention, a method for positioning a vehicle at a charging station, the vehicle or charging station comprising a first communication device being configured to wirelessly communicate with a second communication device by a wireless protocol, is provided. The method comprises:

transmitting a detection signal by a transmitting antenna arranged on the vehicle or charging station, receiving the detection signal from the transmitting antenna by a receiving antenna arranged on the other one of the vehicle and charging station, controlling the transmission of the detection signal by the transmitting antenna and/or the detection of the detection signal by the receiving antenna to determine an angle between the transmitting antenna and the receiving antenna, guiding the vehicle to a predetermined position at the charging station using at least the determined angle, wherein transmitting the detection signal or receiving the detection signal comprises using the first communication device for the transmitting antenna or receiving antenna.

Effects and features of the second aspect of the invention are largely analogous to those described above in connection with the first aspect of the invention. Embodiments mentioned in relation to the first aspect of the invention are largely compatible with the second aspect of the invention, of which some are exemplified below, typically without repeating the advantageous effects.

According to at least one example embodiment, at least one of the transmitting antenna and receiving antenna comprises an array of antenna elements configured to form a radiation pattern having a main lobe, the array of antenna elements being arranged to form a directional antenna, and the method comprises:

changing the shape of the main lobe by controlling the array of antenna elements.

In other words, controlling the transmission of the detection signal by the transmitting antenna and/or the detection of the detection signal by the receiving antenna to determine the angle and direction between the transmitting antenna and the receiving antenna may comprise controlling the array of antenna elements to change the shape of the main lobe. Controlling the transmission of the detection signal by the transmitting antenna and/or the detection of the detection signal by the receiving antenna, typically comprised controlling the direction of maximum intensity of the transmitting antenna, or maximum sensitivity of the receiving antenna.

According to at least one example embodiment, the array of antenna elements is arranged in an xy-plane, and the method comprises:

shaping the main lobe by activating the antenna elements in a focused direction, e.g. the x-direction and/or y-direction.

Such shaping e.g. as described in accordance with the first aspect of the invention.

According to at least one example embodiment, the method comprises:

introducing a phase difference between neighbouring antenna elements in the array of antenna elements.

Such phase difference may be achieved by a phase shifter as discussed in accordance with the first aspect of the invention.

According to at least one example embodiment, the method comprises:

tilting the main lobe by introducing the phase difference between neighbouring antenna elements during shaping the main lobe by activating the antenna elements in a focused direction.

According to at least one example embodiment, the method comprises:

detecting the signal strength of the detection signal in relation to different tilting of main lobe, and
determining the angle between the transmitting antenna and the receiving antenna based on the detected signal strength.

According to at least one example embodiment, the method comprises:

providing known or predetermined value of the vertical distance between the transmitting antenna and receiving antenna.

For example, the vertical distance (or height difference as described with reference to the first aspect of the invention) between the transmitting antenna and receiving antenna may be measured. Such measurement may e.g. be performed by laser measurement. However, typically, the vehicle may know on beforehand the height of the charging station and the height position of the transmitting antenna or receiving antenna, whichever being installed at the charging station. Moreover, the vehicle typically knows the height of the transmitting antenna or receiving antenna, whichever being installed in the vehicle.

According to a third aspect of the present invention, a computer program comprising instructions to cause the system of the first aspect of the invention to execute the steps of the method of the second aspect of the invention, when the program is run on a computer, is provided.

According to a fourth aspect of the present invention, a computer readable medium carrying a computer program comprising instructions to cause the system of the first aspect of the invention to execute the steps of the method of the second aspect of the invention, when the program product is run on a computer, is provided.

Effects and features of the third and fourth aspects of the invention are largely analogous to those described above in connection with the first and second aspects of the invention. Embodiments mentioned in relation to the first and second aspects of the invention are largely compatible with the third and fourth aspects of the invention.

According to a fifth aspect of the invention, a charging station configured to charge a vehicle is provided. The charging station may comprise a system for positioning a vehicle at a charging station, e.g. in accordance with the first aspect of the invention (i.e. by comprising at least one of the transmitting antenna and receiving antenna), or comprises a control unit comprising the computer program or a computer readable medium carrying a computer program, in accordance with the third and fourth aspects of the invention.

According to one example embodiment, the charging station is configured for facilitating positioning of the vehicle at the charging station, the charging station comprising:

a wireless communication arrangement including a first communication device configured to wirelessly communicate with a second communication device by a wireless protocol,
a transmitting antenna configured to transmit a detection signal, or a receiving antenna configured to receive a detection signal transmitted from a transmitting antenna, the transmitting antenna or receiving antenna being configured to interact with a corresponding receiving antenna or transmitting antenna on the vehicle,
wherein the transmission of the detection signal by the transmitting antenna or the detection of the detection signal by the receiving antenna, whichever is comprised in charging station, is controlled to determine an angle between the transmitting antenna or receiving antenna on the charging station and the corresponding receiving antenna or transmitting antenna on the vehicle, which angle is used to determine the distance from the vehicle to a predetermined position at the charging station, and wherein the first communication device comprises the transmitting antenna or receiving antenna, whichever is comprised in the charging station. The distance may be used to guide the vehicle to the predetermined position at the charging station. The distance may be referred to as a route.

Thus, the charging station is configured for wireless communication and may comprise at least a first communication device configured to wirelessly communicate with a second communication device by a wireless protocol. Moreover, the charging station comprises at least the transmitting antenna or the receiving antenna of a vehicle positioning arrangement described with reference to the first aspect of the invention (i.e. a vehicle positioning arrangement comprising a transmitting antenna configured to transmit a detection signal, and a receiving antenna configured to receive the detection signal). The transmission of the detection signal by the transmitting antenna or the detection of the detection signal by the receiving antenna is controlled to determine an angle and direction between the vehicle and the charging station, i.e. between a corresponding pair of a transmitting antenna and a receiving antenna, which angle and direction are used to guide the vehicle to a predetermined position at the charging station, as previously described. Typically, the first communication device comprised in the charging station comprises the transmitting antenna or the receiving antenna, whichever is comprised in the charging station.

According to at least one example embodiment, the charging station comprises a charging post, e.g. configured for overhead charging of the vehicle using e.g. a pantograph. Thus, the charging post may be several meters high, such as e.g. above 1.5 m, or above 2 m. For example, the first communication device comprising the transmitting or receiving antenna is arranged on top of the charging station.

According to a sixth aspect of the invention, a vehicle configured to be charged at a charging station is provided. The vehicle may comprise a system for positioning the vehicle at the charging station, e.g. in accordance with the first aspect of the invention (i.e. by comprising at least one of the transmitting antenna and receiving antenna), or comprises a control unit comprising the computer program or a computer readable medium carrying a computer program, in accordance with the third and fourth aspects of the invention. According to at least one example embodiment, the vehicle comprises the array of antenna elements described with reference to the first aspect of the invention. For example, the array of antenna elements may be comprised in a receiving antenna of the vehicle.

According to at least one example embodiment, the vehicle is configured to be positioned at the charging station, the vehicle comprising:
- a wireless communication arrangement including a first communication device configured to wirelessly communicate with a second communication device by a wireless protocol,
- a transmitting antenna configured to transmit a detection signal, or a receiving antenna configured to receive a detection signal transmitted from a transmitting antenna, the transmitting antenna or receiving antenna being configured to interact with a corresponding receiving antenna or transmitting antenna on the charging station,
wherein the transmission of the detection signal by the transmitting antenna or the detection of the detection signal by the receiving antenna, whichever is comprised in the vehicle, is controlled to determine an angle between the transmitting antenna or receiving antenna on the vehicle and the corresponding receiving antenna or transmitting antenna on the charging station, which angle is used to determine the distance from the vehicle to a predetermined position at the charging station, and wherein the first communication device comprises the transmitting antenna or receiving antenna, whichever is comprised in the charging station. The distance may be used to guide the vehicle to the predetermined position at the charging station. The distance may be referred to as a route. The vehicle may be driven, manually or autonomously, to the predetermined position using the guidance.

Thus, the vehicle is configured for wireless communication and may comprise at least a first communication device configured to wirelessly communicate with a second communication device by a wireless protocol. Moreover, the vehicle comprises at least the transmitting antenna or the receiving antenna of a vehicle positioning arrangement described with reference to the first aspect of the invention (i.e. a vehicle positioning arrangement comprising a transmitting antenna configured to transmit a detection signal, and a receiving antenna configured to receive the detection signal). The transmission of the detection signal by the transmitting antenna or the detection of the detection signal by the receiving antenna is controlled to determine an angle and direction between the vehicle and the charging station, i.e. between a corresponding pair of a transmitting antenna and a receiving antenna, which angle and direction are used to guide the vehicle to a predetermined position at the charging station, as previously described. Typically, the first communication device comprised in the vehicle comprises the transmitting antenna or the receiving, whichever is comprised in the vehicle.

Effects and features of the fifth and sixth aspects of the invention are largely analogous to those described above in connection with the other aspects of the invention. Embodiments mentioned in relation to the other aspect of the invention and applicable for the charging station or the vehicle are largely compatible with the fifth and sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings:

FIG. 1b is a perspective view of the charging station, the vehicle and the system for positioning the vehicle at the charging station of FIG. 1a;

DETAILED DESCRIPTION OF EXAMPLE EMBODIMENTS OF THE INVENTION

Figure 1A:
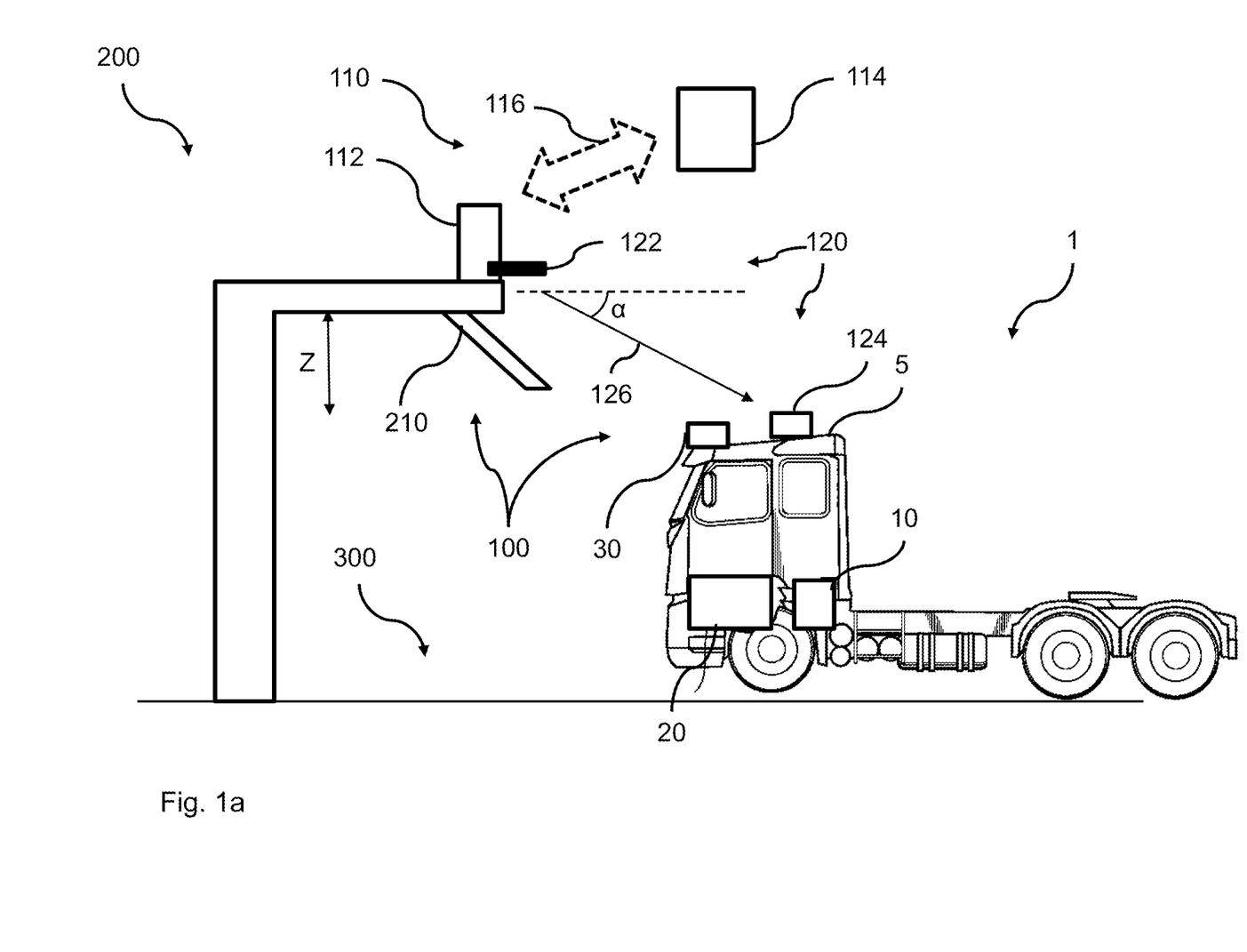
FIG. 1a is a schematic view of a charging station, a vehicle and a system for positioning the vehicle at the charging station in accordance with an example embodiment of the invention.
Figure 1B:
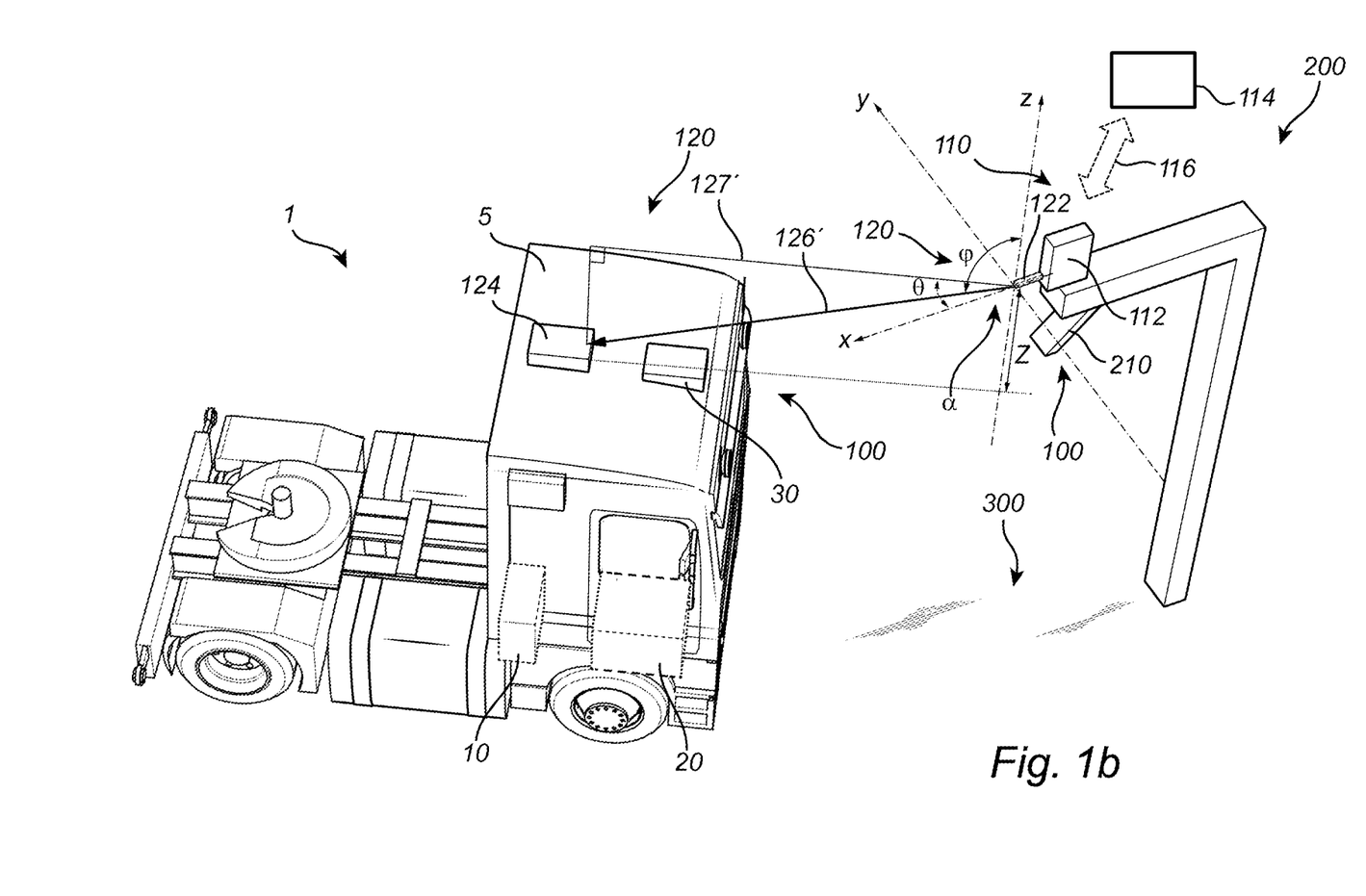

With reference to FIGS. 1a and 1b, a vehicle 1, here embodied as a heavy duty truck 1, is disclosed for which a system 100 for positioning the vehicle 1 at a charging station 200 of a kind disclosed in the present disclosure is advantageous. However, the system 100 may as well be implemented in other types of vehicles, such as in busses, light-weight trucks, passenger cars, marine applications etc, which vehicles are in need of charging. The vehicle 1 is an electric vehicle, such as a full electric vehicle or a hybrid, comprising a battery 10 and a motor or engine 20, here referred to as an electric machine powered by the battery 10. The vehicle 1 is configured to be charged by the charging station 200. In FIGS. 1a and 1 b, the charging is achieved by means of a power transmitter 210 arranged on the charging station 200 and being configured to transfer power to a power receiver 30 of the vehicle 1, but charging may as well be achieved by a wireless charging system (not shown), such as an inductive charging system comprising a transmitting coil and a receiving coil of which one is arranged on the vehicle 1. The vehicle 1 in FIGS. 1a and 1b further comprises a roof 5 comprising the upper side of the vehicle 1, and means for propelling the vehicle 1, such as wheels.

The system 100 for positioning the vehicle 1 at the charging station 200 comprises a wireless communication arrangement 110 having a first communication device 112 configured to wirelessly communicate with a second communication device 114 by a wireless protocol 116. The second communication device 114 may, but do not have to, be comprised in the wireless communication arrangement 110. The first communication device 112 is in FIGS. 1a and 1 b arranged on the charging station 200 and the second communication device 114 is illustrated as being a communication device external of the vehicle 1, but may as well be arranged on the vehicle 1, or may be comprised in a user-carrying device such as a mobile phone. Alternatively, the first communication device 112 may be arranged on the vehicle 1, and the second communication device 114 arranged externally of the vehicle 1 and charging station 200, or arranged on the charging station 200. The wireless communication arrangement 110 may e.g. be a Wi-Fi arrangement using a communication protocol of IEEE 802.11 utilizing various frequencies, including but not limited to, 2.4 GHz, 5 GHz, 6 GHz, and 60 GHz frequency bands.

The system 100 for positioning the vehicle 1 at the charging station 200 further comprises a vehicle positioning arrangement 120 comprising a transmitting antenna 122 configured to transmit a detection signal 126, and a receiving antenna 124 configured to receive the detection signal 126. The detection signal 126 is schematically illustrated as an arrow in FIG. 1a, but may rather be considered as a beam having a certain detection area. In FIGS. 1a and 1 b, the transmitting antenna 122 is arranged on the charging station 200 and the receiving antenna 124 is arranged on the vehicle 1. However, having the transmitting antenna 122 arranged on the vehicle 1, and the receiving antenna 124 arranged on the charging station 200 is also conceivable within the scope of the invention. Regardless if positioned on the charging station 200 or on the vehicle 1, the transmitting antenna 122 is preferably configured to send out a beacon (e.g. in all directions or in a directed direction) and the receiving antenna is configured to scan its surrounding to detect the beacon and to determine the angle, such as the angle in the three dimensional space, to it. For embodiments in which the transmitting antenna 122 is configured to transmit a directed beacon or detection signal (e.g. by including the array of antenna as described below with reference to FIG. 2), the receiving antenna 124 is typically configured to send some type of recognition signal back to the transmitting antenna to verify that the receiving antenna 124 received the beacon (possibly including the signal strength of the same to determine the angle between the transmitting antenna 122 and receiving antenna 124, as will be described below). When the vehicle 1 is close enough to the charging station 200 to enable the receiving antenna 124 to recognize the presence of the transmitting antenna 122 (by e.g. recognizing a beacon signal), the positioning of the vehicle 1 relative the charging station 200 may begin.

In FIGS. 1a and 1 b, the first communication device 112 comprises the transmitting antenna 122. The vehicle positioning arrangement 120 is configured such that the transmission of the detection signal 126 by the transmitting antenna 122 and/or the detection of the detection signal 126 by the receiving antenna 124 is controlled to determine an angle α between the transmitting antenna 122 and the receiving antenna 124. The angle α may be used to guide the vehicle 1 to a predetermined position 300 at the charging station 200 as will be described in more detail with reference to FIG. 4.

Figure 2:
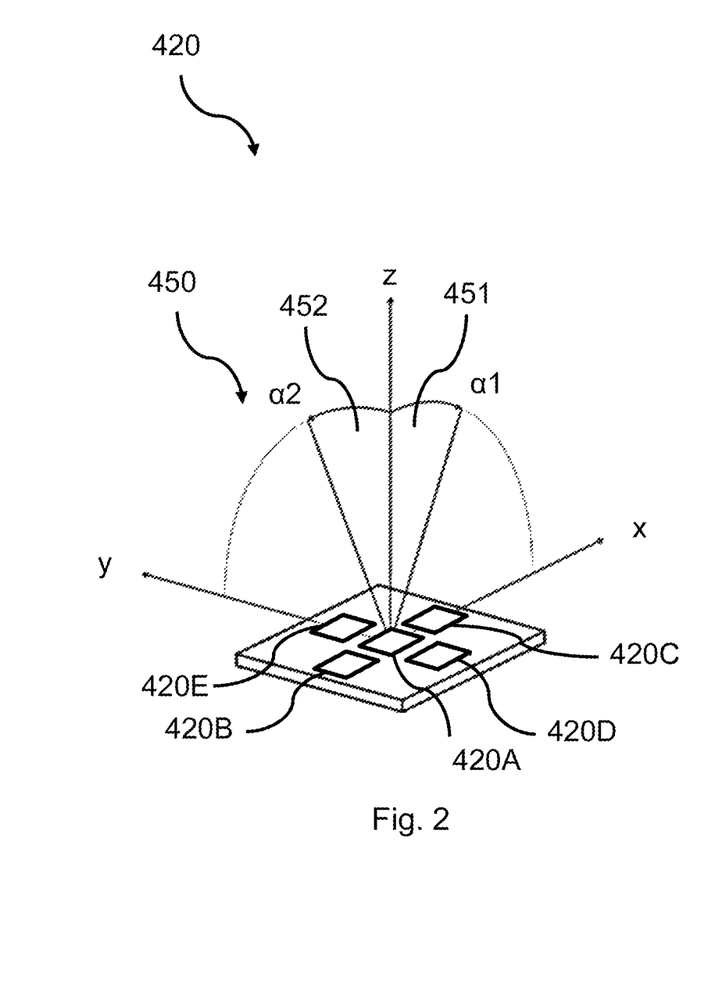
FIG. 2 is a schematic detailed perspective view of an array of antenna elements for at least one of the transmitting antenna and the receiving antenna, in accordance with example embodiments of the invention.

An embodiment of the vehicle positioning arrangement, or at least a part of the vehicle positioning arrangement, will now be described with reference to FIG. 2 and FIGS. 3a, 3b, 3c and 3d. FIG. 2 schematically illustrate an array of antenna elements 420 comprising five antenna elements 420A, 420B, 420C, 420D, 420E (commonly referred to as 420A-E) which may be used in at least one of the transmitting antenna and receiving antenna of the vehicle positioning arrangement (such as e.g. at least one of the transmitting antenna 122 and receiving antenna 124 of the vehicle positioning arrangement 120 of FIGS. 1a and 1b). The antenna elements 420A-E are arranged in an xy-plane in relation to a three dimensional space defined in a Cartesian coordinate system by an x-axis, a y-axis and a z-axis. The array of antenna elements 420 is configured to form a radiation pattern having a main lobe 450. The main lobe 450 has a main extension in the z-direction and a width or breadth in the xy-plane. In the example embodiment of FIG. 2, the five antenna elements 420A-E are arranged in a cross, with three antenna elements 420A, 420B, 420C arranged in a first linear direction being the x-direction, and three antenna elements 420A, 420D, 420E arranged in a second linear direction being the y-direction (thus, the antenna element 420A arranged in the middle of the cross is used as the middle antenna element 420A for both the first and second linear directions of the antenna elements 420A-E).

Figure 3A:
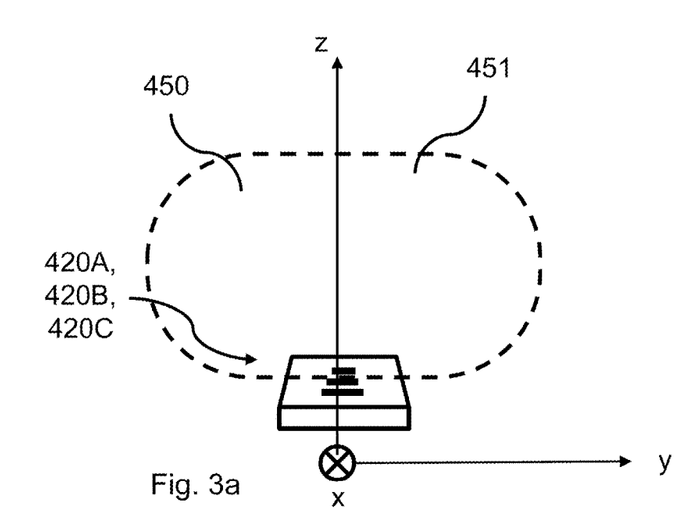
FIGS. 3a, 3b, 3c and 3d are schematic detailed views of the array of antenna elements in accordance with example embodiments of the invention elements.
Figure 3B:
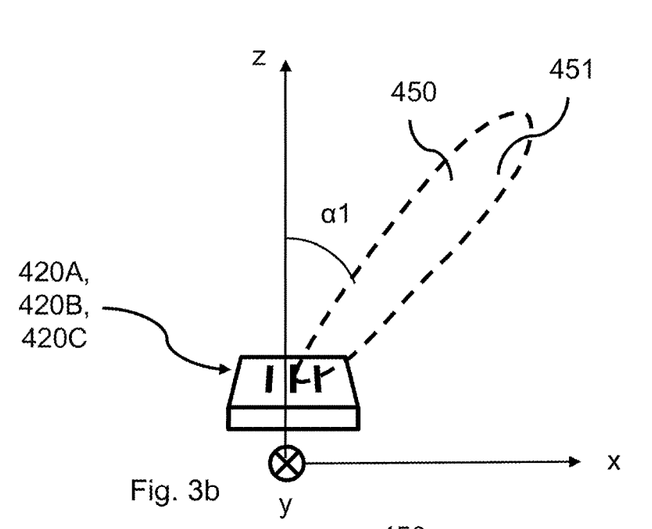
Figure 3C:
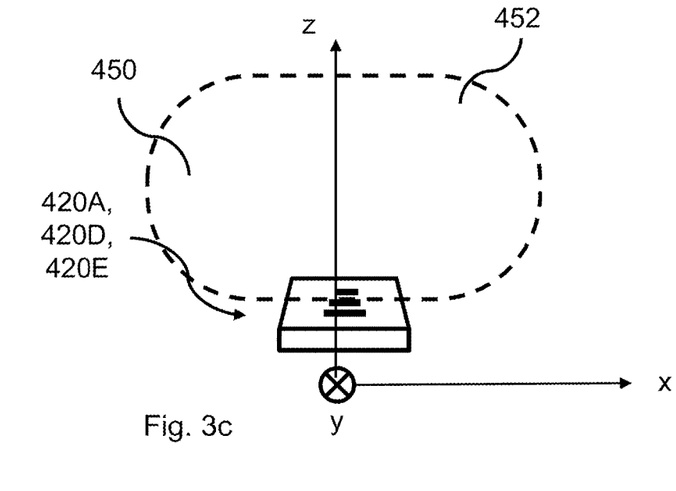
Figure 3D:
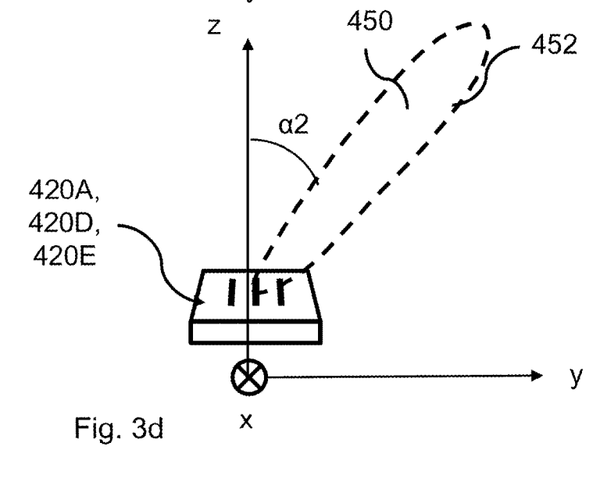

The array of antenna elements 420 are arranged to form a directional antenna being able to change the direction of the main lobe 420. In more detail, the main lobe 450 may be shaped by activating the antenna elements 420A-E in a focused direction. For example, the main lobe 450 may be shaped in a first manner by activating the antenna elements 420A, 420B, 420C in the first linear direction (here being the x-direction). Here the main lobe 450 is shaped to be relative narrow in the x-direction and relatively wide in the y-direction, i.e. the main lobe 450 is shaped by a limited breath in the x-direction, as shown in FIGS. 3a and 3b. Correspondingly, the main lobe 450 may be shaped in a second manner by activating the antenna elements 420A, 420D, 420E in the second linear direction (here being the y-direction). Here the main lobe 450 is shaped to be relatively narrow in the y-direction and relatively wider in the x-direction, i.e. the main lobe 450 is shaped by a limited breath in the y-direction, as shown in FIGS. 3c and 3d. In other words, the vehicle positioning arrangement is, by means of the array of antenna elements 420, configured to shape the main lobe 450 by activating the antenna elements 420A-E in a focused direction, e.g. the x-direction and/or y-direction. It should be understood that the configuration of the array of antenna elements 420 shown in FIG. 2 is only an example, and other type of antenna patterns and other focused directions than the perpendicular x- and y-directions may be used to shape the main lobe 450.

The vehicle positioning arrangement may further be configured to introduce a phase difference between neighbouring antenna elements 420A-E, for example in the first linear direction as a phase difference between the antenna elements 420A, 420B, 420C. This will tilt the main lobe 450 in focused direction, here in the xz-plane with an angle α1, shown by the alternative form 451 of the main lobe 450 in FIG. 2. To further clarify the tilt of the main lobe 450 by the alternative form 451, a schematic illustration of the alternative form 451 of the main lobe is shown in FIGS. 3a and 3b, where different views of the main lobe is shown. In FIG. 3a, the x-axis is extending into the paper, away from the reader, as indicated by the circled cross, and in FIG. 3b the y-axis is extending into the paper. In FIGS. 3a and 3b, only the three active antenna elements 420A, 420B, 420C are indicated by black lines (the other antenna elements 420D, 420E are inactive and not visualised here). As shown particularly in FIG. 3b, the angle α1 of the alternative form 451 of the main lobe 450 relative the z-axis is visualised. Correspondingly, the vehicle positioning arrangement may be configured to introduce a phase difference between neighbouring antenna elements 420A-E in the second linear direction as a phase difference between the antenna elements 420A, 420D, 420E. This will tilt the main lobe 450 in another focused direction, here in the yz-plane with an angle α2, shown by the alternative form 452 of the main lobe 450 in FIG. 2. To further clarify the tilt of the main lobe 450 by the alternative form 452, a schematic illustration of the alternative form 452 of the main lobe 450 is shown in FIGS. 3c and 3d, where different views of the main lobe is shown. In FIG. 3c, the y-axis is extending into the paper, away from the reader, as indicated by the circled cross, and in FIG. 3d the x-axis is extending into the paper. In FIGS. 3c and 3d, only the three active antenna elements 420A, 420D, 420E are indicated by black lines (the other antenna elements 420B, 420C are inactive and not visualised here). As shown particularly in FIG. 3d, the angle α2 of the alternative form 452 of the main lobe 450 relative the z-axis is visualised.

The vehicle positioning arrangement may further be configured to detect the signal strength of the detection signal in relation to different tilting of main lobe 450. By comparing the signal strength with the specific tilting, i.e. the form 451, 452 of the main lobe 450 giving the highest signal strength, the angle between the transmitting antenna and the receiving antenna can be determined. This may e.g. be performed by determining the components of the angle α (α1 and α2 as shown in FIGS. 2, 3a-3d) in the x- and y-directions by comparing signal strength for introduced phase differences between neighbouring antenna elements 420A, 420B, 420C in the first linear direction (x-direction) and comparing signal strength for introduced phase differences between neighbouring antenna elements 420A, 420D, 420E in the second linear direction (y-direction). It should be noted that the main lobe 450, and the shape and tilting of the same is equally applicable to if the array of antenna elements 420 is arranged on the transmitting antenna or the receiving antenna. That is, for the transmitting antenna the main lobe 450 corresponds to the radiation pattern of the transmitted signal, i.e. the detection signal, while for the receiving antenna the main lobe 450 corresponds to the radiation pattern of the reception of the detection signal.

For embodiments in which the receiving antenna 124 comprising the array of antenna elements 420, and thus shapes the main lobe 450, the angle α can be determined directly by detecting the direction in which the receiving antenna 124 receives the strongest detection signal (e.g. by a procedure as previously described). For embodiments in which the transmitting antenna 122 comprises the array of antenna elements 420, and thus shapes the main lobe 450, some kind of secondary information including in which direction the receiving antenna 124 receives the strongest detection signal may be send back as feedback, or the transmitting antenna 122 is programmed to shape the main lobe in a predetermined manner under a specific time scheme (which together with a synchronized detection of the receiving antenna 124 enables determination of the angle α).

Turning back to FIGS. 1a and 1 b, the array of antenna elements 420 being comprised in at least one of the transmitting antenna 122 and receiving antenna 124, the angle α may be determined by the configuration described with reference to FIGS. 2, 3a-3d. Moreover, by knowing the vertical distance Z (e.g. described as z-distance in a corresponding Cartesian coordinate system in FIGS. 1a and 1b) between the transmitting antenna 122 and the receiving antenna 124, the position of the vehicle 1 in relation to the charging station 200 can be determined by the determined angle α and the vertical distance between the antennas 122, 124. The vertical distance between the transmitting antenna 122 and the receiving antenna 124 may e.g. be determined by knowing the vertical position (or height) of the charging station 200 and in particular the vertical position (or height) of the transmitting antenna 122, and knowing the vertical position (or height) of the roof 5 of the vehicle 1 and in particular the vertical position (or height) of the receiving antenna 124. By knowing the position of the vehicle 1 in relation to the charging station 200, the vehicle 1 may be guided to the desired or predetermined position 300 in order to locate the vehicle 1 in a charging position relative the charging station 200, or at least close enough to a charging position for enabling fine tuning positioning of the power transmitter 210 relative the power receiver 30 to initiate charging of the vehicle 1. For example, the guidance of the vehicle 1 into the predetermined position 300 may be achieved by a guiding instructions provided to the driver of the vehicle 1 for enabling the driver to drive the vehicle 1 into the predetermined position 300. During charging, power is transmitted from the charging station 200 to the vehicle 1 for charging the battery 10.

Turning to FIG. 1b, the angle α is shown in relation to a three dimensional space. That is, the angle α between the transmitting antenna and the receiving antenna is an angle α in the three dimensional space. Thus, as the transmitting antenna and the receiving antenna is separated in the three dimensional space, there exist a geometrical vector 126' extending from the transmitting antenna to the receiving antenna corresponding to the direction of the detection signal 126 of FIG. 1a. Such geometrical vector 126' may e.g. be defined in relation to a spherical coordinate system according to ISO 80000-2:2019. Thus, the vehicle positioning arrangement 120 may be configured to determine the angle α, as well as the direction, of the geometrical vector 126' in relation to spherical coordinate system, e.g. determined by the configuration described with reference to FIGS. 2, 3a-3d. The geometrical vector 126' may be referred to as the radial distance from the transmitting antenna 122 to the receiving antenna 124 (with reference to the spherical coordinate system). In other words, in an xyz-coordinate system, the determined angle α may be determined from the polar angle φ measured from the z-axis, and the azimuthal angle φ of its orthogonal projection on a reference plane (xy-plane) that passes through the origin (i.e. the transmitting or receiving antenna) and is orthogonal to the z-direction, measured from a fixed reference direction on that plane. Thus, by the determined angle α in the three dimensional space (i.e. polar angle φ and azimuthal angle φ), and knowing either the radial distance from the transmitting antenna 122 to the receiving antenna 124, or the distance in the z-direction (i.e. the height difference between the transmitting antenna 122 and the receiving antenna 124) the distance in the xy-plane between the transmitting antenna 122 and the receiving antenna 124 may be determined, which in FIG. 1*b* is indicated with the horizontal distance 127'. Hereby, guiding of the vehicle 1 to the predetermined position 300 is facilitated.

According to at least one example embodiment, the vehicle positioning arrangement 120 further comprises a control unit configured to autonomously re-position the vehicle 1, e.g. by taking control over the driving operation of the vehicle 1, and driving the vehicle 1 into the desired position 130.

Figure 4:
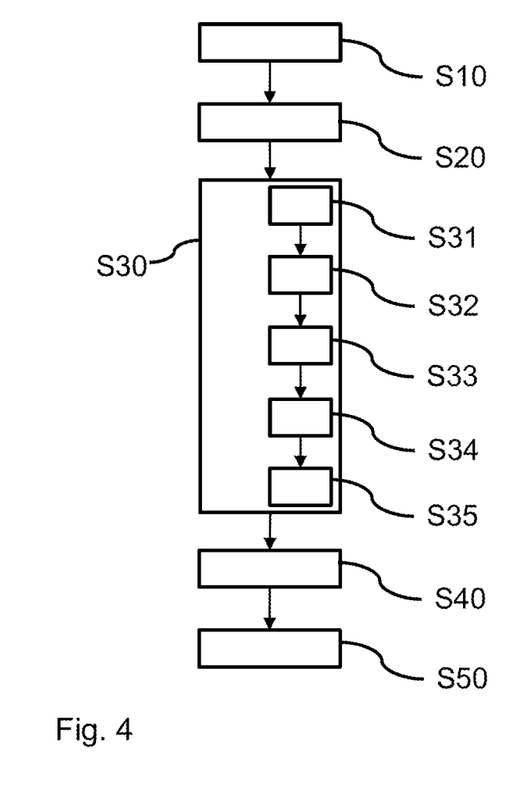
FIG. 4 is a flowchart illustrating the steps of method in accordance with example embodiments of the invention.

The invention will now be described with reference to the flow chart of FIG. 4, describing the steps of a method for positioning a vehicle at a charging station, such as vehicle 1 and the charging station 200 of FIGS. 1*a* and 1 *b*. Thus reference will also be made to the system 100 of FIGS. 1*a* and 1*b*, and the array of antenna elements 420 of FIG. 2. Thus, the vehicle 1 or charging station 200 comprises a first communication device, as first communication device 112, being configured to wirelessly communicate with a second communication device by a wireless protocol.

In a first step, S10, a detection signal is transmitted by a transmitting antenna arranged on the vehicle or charging station. For example, the transmitting antenna 122 on charging station 200 is used for transmitting the detection signal.

In a second step S20, the detection signal from the transmitting antenna is received by a receiving antenna arranged on the other one of the vehicle and charging station. For example, the receiving antenna 124 on the vehicle 1 is used for receiving the detection signal.

According to at least one example embodiment, the detection signal is transmitted as a beacon (at least initially) and the receiving antenna is configured to scan its surrounding and upon detection or recognition of the beacon, the method may continue (by using the beacon, or another type of detection signal).

At least one of the steps S10, S20 comprises using the first communication device for the transmitting antenna or receiving antenna.

In a third step, S30, the transmission of the detection signal by the transmitting antenna and/or the detection of the detection signal by the receiving antenna is controlled to determine an angle between the transmitting antenna and the receiving antenna. This is for example shown in FIG. 1*a* as the angle α between the transmitting antenna 122 and the receiving antenna 124 and in FIG. 1*b*, as the angle α in the three dimensional space (i.e. polar angle φ and azimuthal angle φ). Thus, the determined angle typically includes the direction between the transmitting antenna 122 and the receiving antenna 124.

As described with reference to FIG. 2, at least one of the transmitting antenna and receiving antenna comprises an array of antenna elements 420 configured to form a radiation pattern having a main lobe 450. Thus, in a first sub-step S31 to the third step S30, the shape of the main lobe 450 is changed by controlling the array of antenna elements. Thus, the array of antenna elements 420 may form a directional antenna, for which the angle between the transmitting antenna and the receiving antenna can be determined.

For example, the array of antenna elements 420 is arranged in an xy-plane as shown in FIG. 2, and in a second sub-step S32, the main lobe 450 is shaped by activating the antenna elements 420A-420E in a focused direction, e.g. the x-direction and/or y-direction.

For example, in a third sub-step S33, a phase difference is introduced between neighbouring antenna elements 420A-420E in the array of antenna elements 420. The second and third sub-steps S31, S32 may be carried out simultaneously to tilt the main lobe 450 by introducing the phase difference between neighbouring antenna elements 420A-420E during shaping the main lobe 450 by activating the antenna elements 420A-420E in a focused direction.

In a fourth sub-step S34 the signal strength of the detection signal is detected in relation to different tilting of the main lobe 450. Alternatively, the signal strength of the detection signal is detected in relation to different shaping of the main lobe 450.

In a fifth sub-step S35, the angle between the transmitting antenna and the receiving antenna is determined based on the detected signal strength. That is, based on the detected signal strength in relation to different tilting or shaping of the main lobe 450.

Thus, all of the first to fifth sub-steps S31-S35 may be sub-steps to the third step S30, or at least be carried out during the third step S30.

In a fourth step, S40, known or predetermined value of the vertical distance between the transmitting antenna and receiving antenna is provided. For example, the vertical distance between the transmitting antenna and receiving antenna is measured, or the vertical position of the respective transmitting antenna and receiving antenna is known in relation to some reference frame. The vertical distance between the transmitting antenna and receiving antenna may be referred to the height difference between the transmitting antenna and receiving antenna.

In a fifth step, S50, the vehicle is guided to a predetermined position at the charging station using at least the determined angle. The guidance may e.g. be realised by guiding instructions provided to the driver of the vehicle, or by autonomously driving the vehicle into the predetermined position at the charging station. As previously described, the predetermined position may be a charging position at which charging of the vehicle by the charging station is possible, or at least close enough to such charging position so that at least fine adjustment positioning of the charging means is possible, and that after such fine adjustment positioning of the charging means, charging of the vehicle by the charging station is possible. Such fine adjustment positioning may e.g. be coil adjustments of the relative position of a power emitting coil to the power receiving coil of an inductive charging system. For example, the guidance of the vehicle using the determined angle between the transmitting antenna and the receiving antenna is performed to bring the power receiving coil within an electromagnetic radiation reception distance from the power emitting coil, or the guidance of the vehicle using the determined angle between the transmitting antenna and the receiving antenna is performed to bring a conductor of the power transmitter within reachable distance of a conductor of the power receiver. Typically, the re-positioning of the vehicle during such fine adjustment positioning is far smaller (if occurring at all) compared to the re-positioning of the vehicle impelled by the guidance of the vehicle using the determined angle between the transmitting antenna and the receiving antenna.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system for positioning a vehicle at a charging station, comprising:
   a wireless communication arrangement comprising a first communication device, the first communication device configured to wirelessly communicate with a second communication device by a wireless protocol,
   a vehicle positioning arrangement comprising a transmitting antenna configured to transmit a detection signal, and a receiving antenna configured to receive the detection signal, one of the transmitting antenna and receiving antenna being arranged on the vehicle and the other one on the charging station, the vertical distance between the transmitting antenna and the receiving antenna being known or predetermined,
   wherein the transmission of the detection signal by the transmitting antenna and/or the detection of the detection signal by the receiving antenna is controlled to determine an angle between the transmitting antenna and the receiving antenna, which vertical distance and determined angle are used to determine a horizontal distance between the transmitting antenna and the receiving antenna in order to guide the vehicle to a predetermined position at the charging station, and wherein the first communication device comprises the transmitting antenna or receiving antenna of the vehicle positioning arrangement,
   wherein at least one of the transmitting antenna and receiving antenna comprises an array of antenna elements configured to form a radiation pattern having a main lobe, wherein the array of antenna elements is arranged to form a directional antenna being able to change a shape of the main lobe,
   changing a shape of the main lobe by controlling the array of antenna elements, and comparing a signal strength of the detection signal between the shape and changed shape of the main lobe to determine an angle between the transmitting antenna and the receiving antenna.

2. The system according to claim 1, wherein the array of antenna elements is arranged in an xy-plane, and wherein the vehicle positioning arrangement is configured to shape the main lobe by activating the antenna elements in a focused direction.

3. The system according to claim 1, wherein the vehicle positioning arrangement is configured to introduce a phase difference between neighboring antenna elements.

4. The system according to claim 2, wherein the vehicle positioning arrangement is configured to achieve a tilt of the main lobe by introducing the phase difference between neighboring antenna elements being activated in a focused direction.

5. The system according to claim 4, wherein the vehicle positioning arrangement is configured to detect the signal strength of the detection signal in relation to different tilting of main lobe, and based on the signal strength determine the angle between the transmitting antenna and the receiving antenna.

6. The system according to claim 4, wherein the vehicle positioning arrangement is configured to repeatedly alter the phase difference between the various antenna elements to vary the direction of the main lobe.

7. The system according to claim 1, wherein the vehicle positioning arrangement is configured to position the vehicle at the charging station by re-positioning the vehicle by at least 1 m, or at least 2 m, or at least 5 m.

8. A method for positioning a vehicle at a charging station, the vehicle or charging station comprising a first communication device, first communication device being configured to wirelessly communicate with a second communication device by a wireless protocol, the method comprising:
   transmitting a detection signal by a transmitting antenna arranged on the vehicle or charging station,
   receiving the detection signal from the transmitting antenna by a receiving antenna arranged on the other one of the vehicle and charging station,
   controlling the transmission of the detection signal by the transmitting antenna and/or the detection of the detection signal by the receiving antenna to determine an angle between the transmitting antenna and the receiving antenna,
   providing known or predetermined value of the vertical distance between the transmitting antenna and receiving antenna, and determining a horizontal distance between the transmitting antenna and the receiving antenna by using the vertical distance and the determined angle, guiding the vehicle to a predetermined position at the charging station using at least the determined angle and the horizontal distance,
   wherein transmitting the detection signal or receiving the detection signal comprises using the first communication device for the transmitting antenna or receiving antenna,
   wherein at least one of the transmitting antenna and receiving antenna comprises an array of antenna elements configured to form a radiation pattern having a main lobe, wherein the array of antenna elements is arranged to form a directional antenna being able to change the shape of the main lobe,
   changing a shape of the main lobe by controlling the array of antenna elements, and comparing a signal strength of the detection signal between a shape and changed shape of the main lobe to determine an angle between the transmitting antenna and the receiving antenna.

9. The method according to claim 8, wherein the array of antenna elements is arranged in an xy-plane, the method comprising:
   shaping the main lobe by activating the antenna elements in a focused direction.

10. The method according to claim 9, comprising:
    introducing a phase difference between neighboring antenna elements in the array of antenna elements.

11. The method according to claim 9, comprising:
    tilting the main lobe by introducing the phase difference between neighboring antenna elements during shaping the main lobe by activating the antenna elements in a focused direction.

12. The method according to claim 11, comprising:
    detecting the signal strength of the detection signal in relation to different tilting of main lobe, and
    determining the angle between the transmitting antenna and the receiving antenna based on the detected signal strength.

13. A non-transitory computer readable medium storing a computer program comprising instructions to cause a system to execute the steps of the method of claim 8, when the program is run on a computer.

14. A charging station for charging a vehicle, the charging station being configured for facilitating positioning of the vehicle at the charging station, the charging station comprising:
- a wireless communication arrangement including a first communication device, first communication device configured to wirelessly communicate with a second communication device by a wireless protocol,
- a transmitting antenna configured to transmit a detection signal, or a receiving antenna configured to receive a detection signal transmitted from a transmitting antenna, the transmitting antenna or receiving antenna being configured to interact with a corresponding receiving antenna or transmitting antenna on the vehicle,
- wherein the transmission of the detection signal by the transmitting antenna or the detection of the detection signal by the receiving antenna, whichever is comprised in charging station, is controlled to determine an angle between the transmitting antenna or receiving antenna on the charging station and the corresponding receiving antenna or transmitting antenna on the vehicle, wherein the vertical distance between the transmitting antenna or receiving antenna on the charging station and the corresponding receiving or transmitting antenna on the vehicle is known or predetermined, and which vertical distance and determined angle are used to determine a horizontal distance from the vehicle to a predetermined position at the charging station, and wherein the first communication device comprises the transmitting antenna or receiving antenna, whichever is comprised in the charging station,
- wherein at least one of the transmitting antenna and receiving antenna comprises an array of antenna elements configured to form a radiation pattern having a main lobe, wherein the array of antenna elements is arranged to form a directional antenna being able to change a shape of the main lobe,
- changing a shape of the main lobe by controlling the array of antenna elements, and comparing a signal strength of the detection signal between the shape and changed shape of the main lobe to determine an angle between the transmitting antenna and the receiving antenna.

15. A vehicle configured to be charged at a charging station, the vehicle being configured to be positioned at the charging station, the vehicle comprising:
- a wireless communication arrangement including a first communication device, first communication device configured to wirelessly communicate with a second communication device by a wireless protocol,
- a transmitting antenna configured to transmit a detection signal, or a receiving antenna configured to receive a detection signal transmitted from a transmitting antenna, the transmitting antenna or receiving antenna being configured to interact with a corresponding receiving antenna or transmitting antenna on the charging station,
- wherein the transmission of the detection signal by the transmitting antenna or the detection of the detection signal by the receiving antenna, whichever is comprised in the vehicle, is controlled to determine an angle between the transmitting antenna or receiving antenna on the vehicle and the corresponding receiving antenna or transmitting antenna on the charging station, wherein the vertical distance between the transmitting antenna or receiving antenna on the vehicle and the corresponding receiving or transmitting antenna on the charging station is known or predetermined, and which vertical distance and determined angle are used to determine a horizontal distance from the vehicle to a predetermined position at the charging station, and wherein the first communication device comprises the transmitting antenna or receiving antenna, whichever is comprised in the charging station,
- wherein at least one of the transmitting antenna and receiving antenna comprises an array of antenna elements configured to form a radiation pattern having a main lobe, wherein the array of antenna elements is arranged to form a directional antenna being able to change a shape of the main lobe,
- changing a shape of the main lobe by controlling the array of antenna elements, and comparing a signal strength of the detection signal between the shape and changed shape of the main lobe to determine an angle between the transmitting antenna and the receiving antenna.

16. The system according to claim 1, wherein the predetermined position at the charging station is a charging position, and wherein the vehicle positioning arrangement is configured to guide the vehicle from a non-chargeable position in which the vehicle is distant from the charging position to the charging position, using the horizontal distance between the transmitting antenna and the receiving antenna.

* * * * *